United States Patent
Chen et al.

(10) Patent No.: US 8,576,558 B2
(45) Date of Patent: Nov. 5, 2013

(54) MOUNTING APPARATUS WITH ROTATING MEMBER FOR RETAINING AND BUFFERING DATA STORAGE DEVICE

(75) Inventors: Yun-Lung Chen, New Taipei (TW); Liang-Chin Wang, New Taipei (TW); Jian Hu, Wuhan (CN); Yu-Ming Xiao, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 120 days.

(21) Appl. No.: 13/222,673

(22) Filed: Aug. 31, 2011

(65) Prior Publication Data
US 2012/0243167 A1 Sep. 27, 2012

(30) Foreign Application Priority Data
Mar. 21, 2011 (CN) .......................... 2011 1 0067677

(51) Int. Cl.
*H05K 7/00* (2006.01)
(52) U.S. Cl.
USPC ............ 361/679.31; 361/679.33; 361/679.39; 361/679.58
(58) Field of Classification Search
USPC .............. 361/679.31–679.33, 679.39, 679.58
See application file for complete search history.

(56) References Cited

U.S. PATENT DOCUMENTS

| | | | | |
|---|---|---|---|---|
| 5,077,722 A * | 12/1991 | Geist et al. | ..................... | 720/657 |
| 7,440,271 B2 * | 10/2008 | Chen et al. | ............... | 361/679.33 |
| 7,609,516 B2 * | 10/2009 | Chen et al. | .................. | 361/679.6 |
| 2007/0019377 A1 * | 1/2007 | Chen et al. | ..................... | 361/685 |
| 2009/0212182 A1 * | 8/2009 | Ding | ........................ | 248/225.11 |
| 2011/0051356 A1 * | 3/2011 | Yang et al. | ............... | 361/679.39 |

* cited by examiner

*Primary Examiner* — Anatoly Vortman
*Assistant Examiner* — Jacob Crum
(74) *Attorney, Agent, or Firm* — Altis & Wispro Law Group, Inc.

(57) ABSTRACT

A mounting apparatus for mounting a data storage device includes a sliding member, a drive bracket, and a rotating member. The drive bracket includes a first side plate. A sliding groove is defined in the first side plate. The sliding member is received in the sliding groove. The rotating member is pivotally mounted to the first side plate. A curled piece and an arm are located on opposite ends of the rotating member. The arm defines a restricting room. The rotating member is adapted to rotate on the first side plate between a first position and a second position. In the first position, the curled piece abuts the first side plate and is elastically deformed by the first side plate, and the sliding member is disengaged from the restricting room. In the second position, the curled piece is released, and the restricting room receives and restricts the sliding member therein.

20 Claims, 5 Drawing Sheets

MOUNTING APPARATUS WITH ROTATING MEMBER FOR RETAINING AND BUFFERING DATA STORAGE DEVICE

BACKGROUND

1. Technical Field

The present disclosure relates to mounting apparatuses, more particularly to a mounting apparatus for mounting data storage devices.

2. Description of Related Art

Many data storage devices, such as hard disk drives, floppy disk drives, and optical drives are simply screwed to a drive bracket of a computer enclosure. However, this conventional method of mounting data storage devices is known as being painstaking and time-consuming.

Another mounting method is to use sliding members. Two sliding members are secured on two sides of a data storage device. A hole is defined in a front portion of each of the sliding members. A drive bracket defines a pair of guiding slots and two threaded holes in a front portion. The two sliding members slide into the guiding slots of the drive bracket, and two screws extend through the holes and screw in the threaded holes to secure the data storage device on the drive bracket. The data storage device is thus easily mounted. However, this method is still inconvenient, for screws are also needed to stably mount the data storage device.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
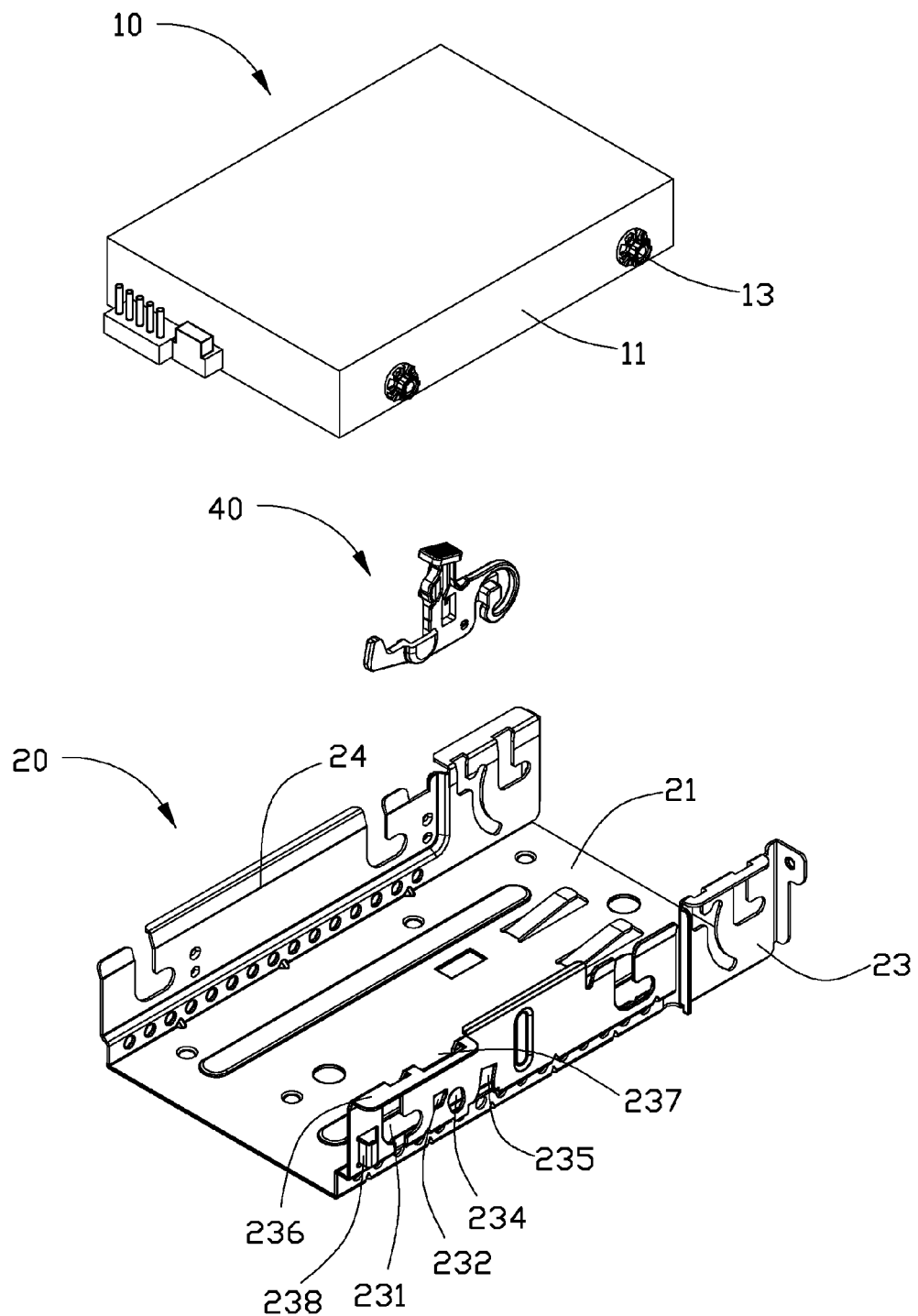
FIG. 1 is an isometric and exploded view of an exemplary embodiment of a mounting apparatus for a data storage device.

Referring to FIG. 1, a mounting apparatus for mounting a data storage device 10 includes a drive bracket 20 and a data storage device 10.

The data storage device 10 includes opposite side walls 11. Each side wall 11 defines a pair of sliding members 13.

Figure 3:
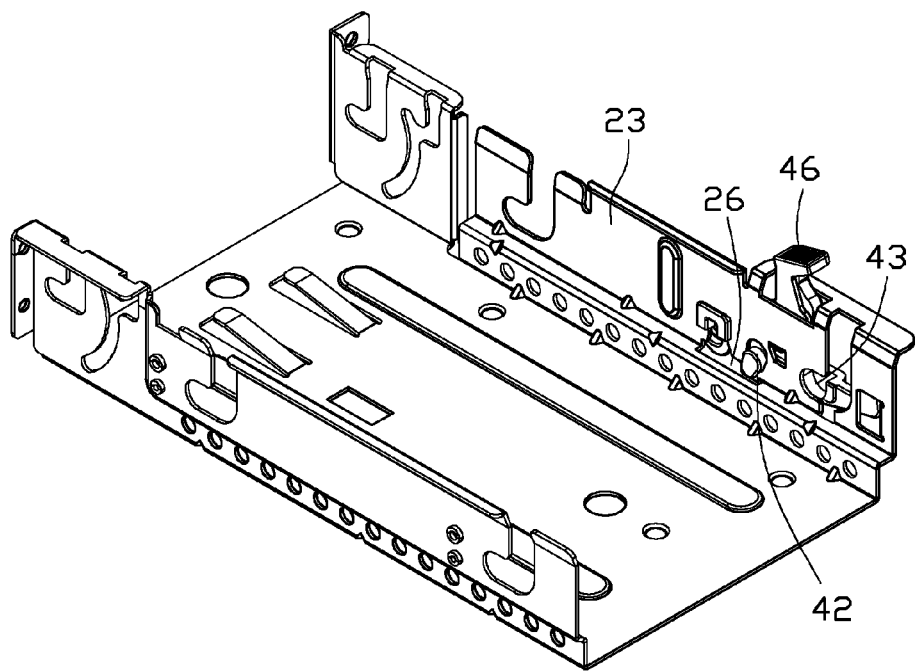
FIG. 3 is an assembly view of the mounting apparatus of FIG. 1.
Figure 4:
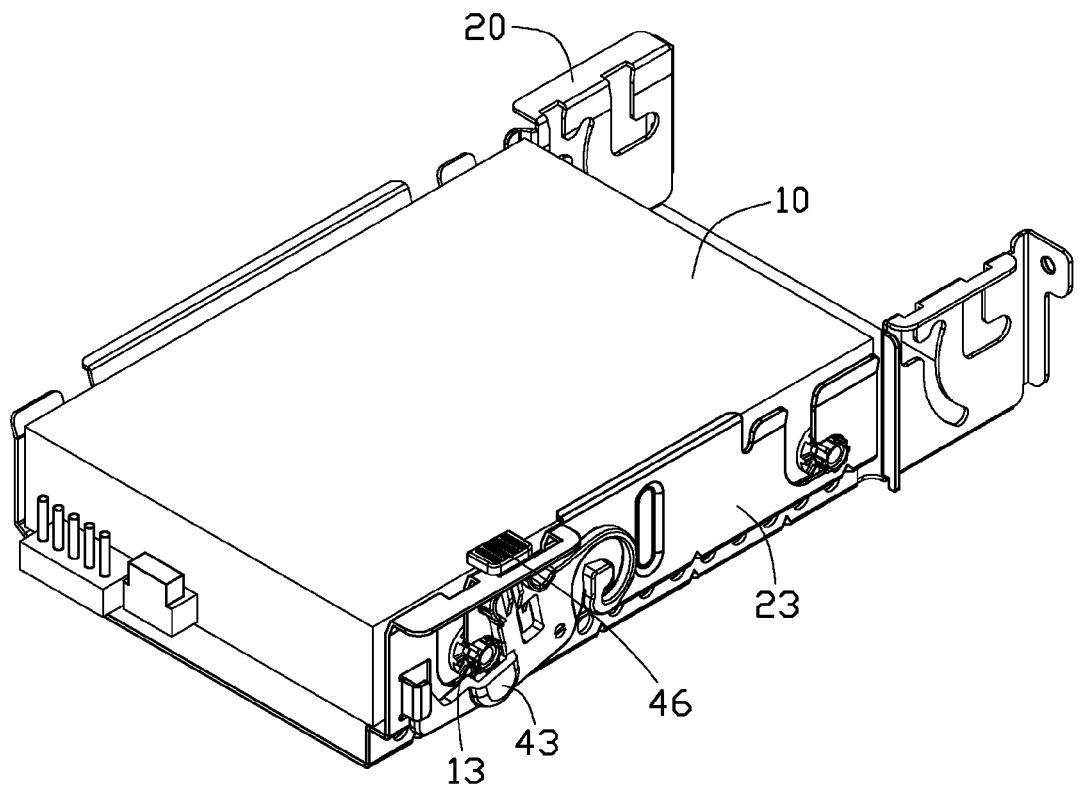
FIG. 4 is another assembly view of the mounting apparatus of FIG. 1.
Figure 5:
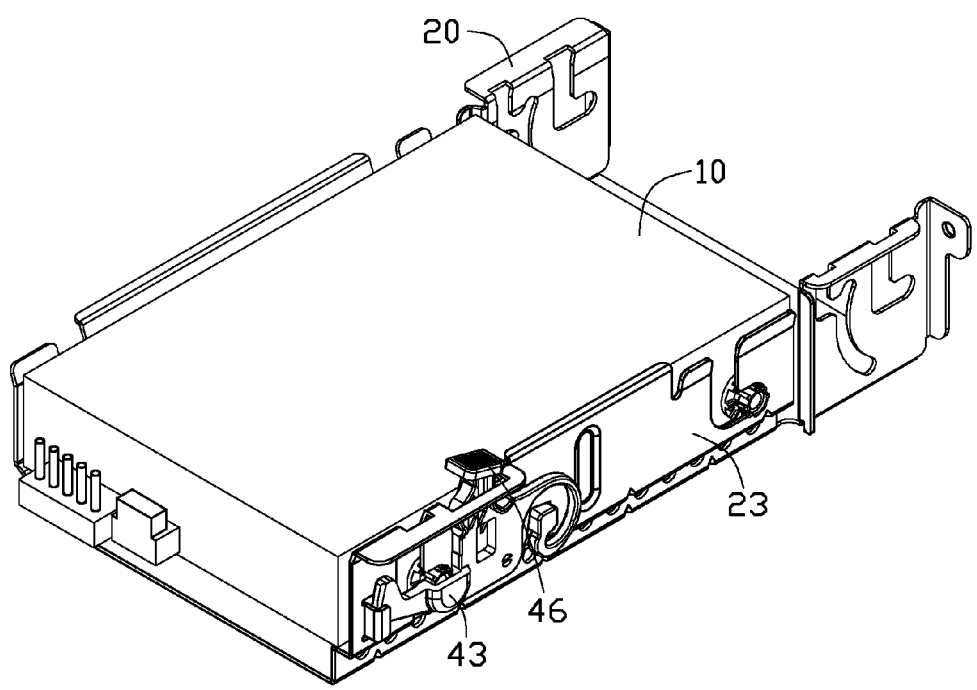
FIG. 5 is another more assembly view of the mounting apparatus of FIG. 1.

The drive bracket 20 includes a bottom plate 21, a first side plate 23, and a second side plate 24. The first side plate 23 and the second side plate 24 are mounted on opposite edges of the bottom plate 21. A flange 236 is connected to a top edge of a rear portion of the first side plate 23. An "L"-shaped restraining piece 238 is connected to the first side plate 23. The restraining piece 238 is located below the flange 236. Each of the first side plate 23 and the second side plate 24 has a pair of "L"-shaped sliding grooves 231. One sliding groove 231 of the first side plate 23 extends through the flange 236. An opening 237 is defined in the flange 236. The first side plate 23 further defines an engaging hole 232, a pivot hole 234, and a receiving slot 235, located below the flange 236. A bottom end of the receiving slot 235 has a cutout 26 which is wider than the receiving slot 235 (referring to FIG. 3).

Figure 2:
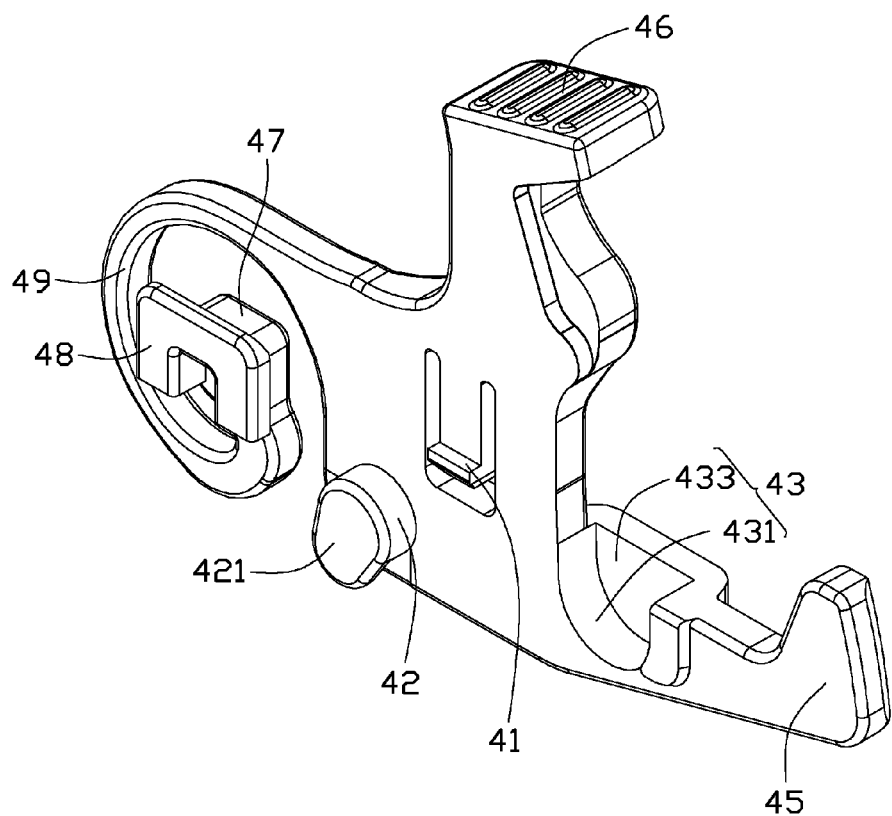
FIG. 2 is an isometric view of a rotating member of the mounting apparatus of FIG. 1.

Referring to FIG. 2, the rotating member 40 includes a clasp 41. A top portion of the rotating member 40 is a pressing portion 46, on which a plurality of ribs is formed. A left portion of the rotating member 40 is an arm, and a right portion of the rotating member is a curled piece 49. A "U"-shaped restricting room 43 is defined in the arm 45. The restricting room 43 comprises a receiving cutout 431 and a shielding panel 433 covering the receiving cutout 431. The sliding member 13 can abut the shielding panel 433 when received in the restricting room 43. The curled piece 49 is an elastic piece and can be elastically deformed. A resisting block 47 is connected to a distal end of the curled piece 49. A side of the resisting block 47 is connected to a restricting piece 48. A width of the resisting bock 47 is smaller than that of the receiving slot 235, so the resisting block 47 can slide in the receiving slot 235. A width of the resisting piece 48 is larger than that of the receiving slot 235. The width of the resisting piece 48 is smaller than that of the cutout 26, so the resisting piece 48 can be inserted in the cutout 26. A pivot pin 42 is located on a middle portion of rotating member 40. A tab 421 is connected to a free end of the pivot pin 42.

Referring to FIGS. 1 to 5, in assembly, the resisting block 47 and the restricting piece 48 are aligned with the cutout 26. The pressing portion 46 is aligned with the opening 237. The rotating member 40 is moved to insert the pressing portion 46 in the opening 237. The resisting block 47 and the restricting piece 48 are inserted in the cutout 26. The resisting block 47 slides in the receiving slot 235. The restricting piece 48 abuts the inner surface of the first side plate 23. The tab 421 is inserted through the pivot hole 234. The pivot pin 42 is received in the pivot hole 234. The tab 421 abuts the inner surface of the first side plate 23. The arm 45 is placed between the restraining piece 238 and the first side plate 23. The clasp 41 engages in the engaging holes 232, and can move slightly in the engaging hole 232. Therefore, the rotating member 40 is mounted on the first side plate 23. In this position, the resisting block 47 resists against a top edge of the receiving slot 235, and the restricting room 43 is in alignment with the sliding groove 231.

In succession, the pressing portion 46 is pressed. The pivot pin 42 rotates in the pivot hole 234. The top edge of the receiving slot 235 exerts force on the resisting block 47 to elastically deform the curled piece 49. Simultaneously, the arm 45 slides downward and along the first side plate 23. The restricting room 43 moves away from the sliding groove 231. Then, the sliding member 13 of the data storage device 10 slides in the sliding groove 231. Next, the pressing portion 46 is released. The curled piece 49 rebounds. The arm 45 slides upward and along the first side plate 23. The restricting room 43 moves to receive and restrict the sliding member 13. The sliding member 13 cannot move out of the sliding groove 231. Therefore, the data storage device 10 is mounted in the drive bracket 20.

For detaching the data storage device 10 from the drive bracket 20, the pressing portion 46 is pressed to move the restricting room 43 away from the sliding member 13. The sliding member 13 moves out of the sliding groove 231 to detach the data storage device 10 from the drive bracket 20.

It is to be understood, however, that even though numerous characteristics and advantages of the embodiments have been set forth in the foregoing description, together with details of the structure and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for mounting a data storage device, comprising:
   a sliding member;
   a drive bracket comprising a first side plate, a sliding groove, a receiving slot, and a cutout communicating with the receiving slot defined in the first side plate, the sliding member received in the sliding groove; and
   a rotating member pivotally mounted to the first side plate, a curled piece and an arm located on opposite ends of the rotating member, a resisting block extending from a distal end of the curled piece, and a restricting piece extending from a side of the resisting block; the resisting block slidably received in the receiving slot, and the restricting piece engaged in the cutout and abutting an inner surface of the first side plate, the arm defining a restricting room,
   wherein the rotating member is adapted to rotate on the first side plate between a first position and a second position; in the first position, the curled piece abuts the first side plate and is elastically deformed by the first side plate, and the sliding member is disengaged from the restricting room; in the second position, the curled piece is released, and the restricting room receives and restricts the sliding member therein.

2. The mounting apparatus of claim 1, wherein a width of the cutout is greater than that of the receiving slot.

3. The mounting apparatus of claim 1, wherein a side of the resisting block is connected to a restricting piece, and the restricting piece abuts the first side plate.

4. The mounting apparatus of claim 1, wherein the rotating member comprises a pressing portion; in the first position, the pressing portion is pressed; and in the second position, the pressing portion is released.

5. The mounting apparatus of claim 4, wherein a flange is connected to a top edge of the first side plate, the first side plate defines an opening, and the pressing portion is inserted through the opening and abuts an outer surface of the first side plate.

6. The mounting apparatus of claim 1, wherein a restraining piece extends from an outer surface of the first side plate, and the arm is placed between the restraining piece and the first side plate.

7. The mounting apparatus of claim 1, wherein the rotating member comprises a pivot pin, the first side plate defines a pivot hole, and the pivot pin is pivotally mounted in the pivot hole.

8. The mounting apparatus of claim 7, wherein a tab is connected to a free end of the pivot pin, and the tab abuts the first side plate.

9. The mounting apparatus of claim 1, wherein the rotating member comprises a clasp, the first side plate defines an engaging hole, the clasp engages in the engaging hole, and the clasp is adapted to move slightly in the engaging hole when the rotating member rotates on the first side plate.

10. An assembly, comprising:
    a data storage device with a sliding member attached thereon;
    a drive bracket comprising a first side plate, a sliding groove defined in the first side plate, the sliding member received in the sliding groove, a restraining piece connected to the first side plate; and
    a rotating member comprising an arm, the arm restricted by the restraining piece and movable along the first side plate, the arm defining a restricting room, the restricting room comprising a receiving cutout and a shielding panel covering the receiving cutout, wherein the arm is adapted to move on the first side plate between a first position and a second position; in the first position, the sliding member is disengaged from the restricting room; in the second position, the restricting room receives the sliding member therein, and the sliding member abuts the shielding panel.

11. The assembly of claim 10, wherein the arm is connected to a first end of the rotating member, and a curled piece is connected to the second end of the rotating member, a middle portion of the rotating member is pivotally mounted to the first side plate; in the first position, the curled piece abuts the first side plate and is elastically deformed by the first side plate; and in the second position, the curled piece is released.

12. The assembly of claim 11, wherein the rotating member comprises a pivot pin at the middle portion thereof, the first side plate defines a pivot hole, and the pivot pin is pivotally mounted in the pivot hole.

13. The assembly of claim 12, wherein a tab is connected to a free end of the pivot pin, and the tab abuts the first side plate.

14. The assembly of claim 11, wherein a resisting block is connected to a distal end of the curled piece, the first side plate defines a receiving slot, and the resisting block slidably resists against a top edge of the receiving slot at the first position.

15. The assembly of claim 14, wherein a restricting piece extends from a side of the resisting block, a cutout is defined in the first side plate and communicates with the receiving slot, and the restricting piece is engaged in the cutout and abuts an inner surface of the first side plate.

16. The assembly of claim 11, wherein the rotating member comprises a pressing portion, in the first position, the pressing portion is pressed; and in the second position, the pressing portion is released.

17. The assembly of claim 16, wherein a flange is connected to a top edge of the first side plate, the first side plate defines an opening, and the pressing portion is inserted through the opening and abuts an outer surface of the first side plate.

18. The assembly of claim 10, wherein the rotating member comprises a clasp, the first side plate defines an engaging hole, the clasp engages in the engaging hole, and the clasp is adapted to move slightly in the engaging hole when the arm moves on the first side plate.

19. The assembly of claim 15, wherein a width of the cutout is greater than a width of the receiving slot.

20. The mounting apparatus of claim 1, wherein the restricting room comprises a receiving cutout and a shielding panel covering the receiving cutout; and when the rotating member is in the second position, the restricting room receives the sliding member, and the sliding member abuts the shielding panel.

* * * * *